United States Patent [19]
Chen et al.

[11] Patent Number: 5,293,410
[45] Date of Patent: Mar. 8, 1994

[54] NEUTRON GENERATOR

[75] Inventors: Felix K. Chen, Newtown; Arthur D. Liberman, Ridgefield, both of Conn.

[73] Assignee: Schlumberger Technology Corporation, Houston, Tex.

[21] Appl. No.: 754,842

[22] Filed: Sep. 4, 1991

[51] Int. Cl.$^5$ .............................................. G21B 1/00
[52] U.S. Cl. .................................... 376/108; 376/114
[58] Field of Search ........................ 376/108, 114, 109

[56] References Cited

U.S. PATENT DOCUMENTS

| | | | |
|---|---|---|---|
| 2,543,728 | 7/1948 | Lemmens et al. | 313/337 |
| 2,750,527 | 11/1952 | Katz | 313/346 |
| 3,276,974 | 10/1966 | Tyson | 204/32 |
| 3,490,944 | 1/1970 | Almer et al. | 117/217 |
| 3,546,512 | 12/1970 | Frentrop | 376/108 |
| 3,756,682 | 9/1973 | Frentrop | 376/108 |
| 3,775,216 | 11/1973 | Frentrop | 376/108 |
| 4,007,393 | 2/1977 | Van Stratum et al. | 313/346 R |
| 4,165,473 | 8/1979 | Falce | 313/346 R |
| 4,600,838 | 7/1986 | Steinman et al. | 250/270 |
| 4,721,853 | 1/1988 | Wraight | 250/269 |
| 4,794,792 | 1/1989 | Flaum et al. | 73/152 |
| 4,996,017 | 2/1991 | Ethridge | 376/116 |

OTHER PUBLICATIONS

Penning and Moubis, "A neutron tube without pumping system," *Physica* 4, (1937).
Chen, "Investigation of the striking characteristics of a Penning ion source," *Journal of Applied Physics*, 56 (11), Dec. 1, 1984, pp. 3191-3197.
Ethridge et al., "Neutron generators for Wireline application," 1990 *IEEE Nuclear Science Symposium Conference Record*, Arlington, Va., Oct. 22-23, 1990, vol. 2, pp. 820-824.
Scott, "Focused beam source of hydrogen and helium ions," *Phys. Rev.*, vol. 55, May 15, 1939, pp. 954-959.
Wood and Crocker, "An electrostatically focused ion source and its use in a sealed off DC neutron source," *Nuclear Instruments and Methods*, 21 (1963), pp. 47-48.
Dworetsky et al., "Electron bombardment ion source for low energy beams," Review of Scientific Instruments, vol. 39, No. 11, Nov. 1968, pp. 1721-1723.
Kohl, *Materials and Techniques for Electron Tubes*, Reinhold Publishing, 1960, pp. 519-566.
Forman, "Surface studies of barium and barium oxide on tungsten and its application to understanding the mechanism of operation of an impreganted tungsten cathode," *Journal of Applied Physics*, vol. 47, No. 12, Dec. 1976, pp. 5272-5279.
Falce, "A cavity reservoir dispenser cathode for CRT's and low-cost traveling-wave tube application," *IEEE Transactions on Electron Devices*, vol. 36, No. 1, Jan. 1989, pp. 169-172.
Marrian and Shih, "Operation of coated tungsten based dispenser cathodes in nonideal vacuum," *IEEE Transactions on Electron Devices*, vol. 36, No. 1, Jan. 1989, pp. 173-179.
Hawkins and Sutton, "Compact pulsed generator of fast neutrons," *Review of Scientific Instruments*, vol. 31, No. 3, Mar. 1960, pp. 241-248.
Hall et al., "Improvements in pulsed neutron capture logging," IEEE Transactions on Nuclear Science, vol. NS-28, No. 2, Apr. 1981, pp. 1680-1684.

*Primary Examiner*—Donald P. Walsh
*Assistant Examiner*—Frederick H. Voss
*Attorney, Agent, or Firm*—Leonard W. Pojunas

[57] ABSTRACT

A neutron generator, comprising:
(i) an ion source comprising an anode and a thermionic cathode disposed in an ionizable gas environment (e.g. hydrogen isotope);
(ii) means for heating the cathode so that the latter emits electrons which, when colliding with the gas atoms, generate ions;
(iii) a target;
(iv) an electrical gap to accelerate ions from the ion source towards the target upon impingement of the ions; and
(v) control means for applying voltages to the anode, cathode and electrical gap.

The cathode is of the dispenser type or volume type, and preferably comprises one block of material comprised of a substrate impregnated with an electron emitting material.

39 Claims, 3 Drawing Sheets

NEUTRON GENERATOR

BACKGROUND OF THE INVENTION

1. Field of the Invention

This invention relates to neutron generating systems and more particularly pertains to a new and improved neutron generator especially adapted to traverse the narrow confines of a well or borehole, although useful in a variety of other applications. Since a neutron generator embodying the invention is ideally suited to the needs of well logging services, it will be described in that connection.

2. The Related Art

The use of a generator of high energy neutrons has been known for a long time for neutron-gamma ray or neutron-neutron logging. A neutron generator has advantages compared with chemical neutron sources, in particular it features a negligible amount of radiation other than the desired neutrons; a high yield of neutrons; a controllable yield of neutrons in bursts or continuously; neutrons at higher energies than formerly possible; mono-energetic neutrons; and control of the generator so as to permit its deactivation prior to withdrawal from or insertion in a well. The first five of these attributes are important in obtaining more informative logs, while the last is valuable in minimizing health hazards to operating personnel.

Neutron generators used in oil well logging tools usually require controlled low pressure atmospheres and high intensity magnetic fields. Accordingly, for illustrative purposes, the invention is described in more complete detail in connection with a neutron generator suitable for use in a well logging tool.

Neutron generators usually have three major features:

(i) a gas source to supply the reacting substances, such as deuterium ($H^2$) and tritium ($H^3$);

(ii) an ion source comprising usually at least one cathode and an anode; electrons are emitted from the cathode surface when an electrical impulse is applied to the anode; impact of the primary electrons on the gas molecules result in subsequent secondary electrons being stripped from the gas molecules, thus generating positively charged ions; and (iii) an accelerating gap which impels the ions to a target with such energy that the bombarding ions collide with deuterium or tritium target nuclei in neutron (n) generating reactions:

$$H^2 + H^2 \rightarrow He^3 + n + 3.26 \text{ MeV}$$

$$H^2 + H^3 \rightarrow He^4 + n + 17.6 \text{ MeV}$$

$$H^3 + H^3 \rightarrow He^4 + 2n + 13 \text{ MeV}$$

where $He^3$ and $He^4$ are helium isotopes, and the energy is expressed in millions of electron volts (MeV).

Ordinarily, negative electrons and positively charged ions are produced through electron and uncharged gas molecule collisions within the ion source. Electrodes of different potential contribute to ion production by accelerating electrons to energy higher than the ionization threshold. Collisions of those energetic electrons with gas molecules produce additional ions and electrons. At the same time, some electrons and ions are lost to the anode and cathode. In this manner, the positive and negative charges inside the ion source approach an equilibrium. Collision efficiency can be increased by lengthening the distance that the electrons travel within the ion source before they are neutralized by striking a positive electrode. One known path lengthening technique establishes a magnetic field which is perpendicular to the aforementioned electric field. The combined magnetic and electrical fields cause the electrons to describe a helical path within the ion source which substantially increases the distance traveled by the electrons within the ion source and thus enhances the collision efficiency of the device.

This type of ion source, called "Penning ion source", is part of a family of "cold cathode ion sources" and has been known as early as 1937; see for example the article by F. M. Penning and J. H. A. Moubis in Physica 4 (1937) 1190. Examples of neutron generators including such "cold cathode ion source" used in logging tools are described e.g. in U.S. Pat. No. 3,546,512 or 3,756,682 both assigned to Schlumberger Technology Corporation.

However, neutron generators using Penning ion sources used in logging tools suffer from several drawbacks.

First, the anode being at a high potential, in the range of 1 to 3 kV, the cathode suffers erosion due to energetic ion bombardment. Material sputtered from the cathode may coat the insulator surfaces provided for electrical insulation either of the anode or of the target. This may cause instability which is prejudicial to the operation of the ion source. Also, this instability occurring in a space where high voltages are involved can be detrimental to safety.

Second, most logging nuclear measurements are carried out by emitting pulses of neutrons which irradiate the earth formations, and by detecting the radiation (neutrons or gamma rays) resulting from the interaction of earth formation atoms and the emitted neutrons. Thus, it is critical to have a good knowledge of the characteristics of the neutron pulse, such as the neutron output (number of neutrons emitted) and the pulse timing. Such knowledge means having control over these characteristics. It is highly desirable to generate neutron pulses having a substantially square shape, in particular a short rise time (to reach the plateau value) and a short fall time (once the voltages are turned off). However, in a Penning source, such tasks are difficult because the charge populations in the source, particularly the electron population, do not reach equilibrium instantaneously; see F. Chen, J. Appl. Phys. 56 (11) 3191, 1984. The rate at which the charge populations approach the equilibrium depends strongly on the gas pressure in the source. This effect manifests itself in the slow rise time of the neutron pulse, and a delay, typically a few microseconds (although sometimes variable with operation conditions), between the time the voltage appears at the anode and the start of the neutron pulse. Since the cathode and anode surface conditions are not identical between different neutron tubes, different pressures are often required to achieve the same neutron output. This makes the timing control of the source all the more difficult that it is essentially a function of the particular neutron generator, and may vary over the operating lifetime of the neutron generator.

Third, the high voltage required for a Penning ion source (1–3 kV) is generally produced via a pulse transformer. The transformers are designed for a certain pulse width. Thus, changing pulse length results in altering the performance, most noticeably, the neutron pulse shape. There have been some attempts to improve the neutron pulse shape generated from a cold cathode ion source. In particular, the article "Neutron Generators for Wireline Application," from R. Ethridge et al., 1990 IEEE Nuclear Science Symposium Conference Record, Arlington, Va., Oct. 22-23, 1990, Vol. 2 of 2, describes a cold cathode source wherein the pulse transformer is provided with a "clamping" circuit designed to decrease the fall time of the pulse. However, such clamping circuits: (i) do not seem to improve the rise time of the neutron pulse; (ii) require additional power; (iii) and increase the overall size of the control circuit.

Fourth, the known cold cathode sources can usually operate in any one of several discharge modes according to the relative ion and electron populations and different plasma sheath structures. The anode voltage, the magnetic field and the gas pressure determine the operating point at which the production and loss of electrons and ions are at balance. In addition, under certain conditions, the operating point is unstable near certain mode boundaries. The transition from one mode to the other can lead to a substantial change in the ion beam density and electron extraction efficiency, and, with control circuits currently used that regulate the beam current by lowering the gas pressure, to a reduction in gas pressure that can result in oscillations about the mode boundary. The resulting neutron output variations are detrimental to the overall quality of the measurements.

Fifth, the means for generating the magnetic field, intended to lengthen the electrons path, are relatively cumbersome and increase the overall dimensions and weight of the neutron generator. This is of concern in a logging tool where room is limited.

An alternative to the cold cathode ion sources are "hot cathode" ion sources, proposed as early as 1939, associated to a spectrograph, as depicted e.g. in the article "Focused Beam Source of Hydrogen and Helium Ions" by G. W. Scott Jr., in Physical Review, May 15, 1939, volume 55. Further developments in the same technical area provided some modifications to the basic hot cathode ion source; see e.g. the article "An Electrostatically Focused Ion Source and its Use in a Sealed-Off D.C. Neutron Source" by J. D. L. H. Wood and A. G. Crocker, Nuclear Instruments and Methods, 21 (1963) pages 47-48; or the article "Electron Bombardment Ion Source for Low Energy Beams" by S. Dworetsky et al., in The Review of Scientific Instruments, November 1968, volume 39, No. 11. A "hot cathode" typically comprises a material susceptible, when heated, to emit electrons. The cathode is disposed above, or concentrically to, the anode. An extracting electrode (also called focusing electrode) is placed at the front of the anode to extract ions, generated from collisions between electrons and gas molecules, and focus such ions so as to form an ion beam.

Hot cathode ion sources by themselves bring some improvements with respect to cold cathode ion sources. Hot cathode sources for instance: (i) do not always require a magnetic field, and this allows a substantial reduction in weight and dimensions; (ii) are able to generate an optimum electron flux in a relatively short period of time after the voltage pulse is applied to the anode; (iii) as being used in sealed neutron generator, do not show troublesome mode transitions in the range of gas pressure where these devices normally operate; and (iv) do not require a high anode or cathode voltage when used in neutron generators including a discharging gas made of deuterium and tritium; this reduced voltage entails a reduction in electrode erosion.

However, hot cathode ion sources present drawbacks of their own compared to cold cathode ion sources, such as: (i) additional power; (ii) a relatively reduced lifetime at least for most of hot cathode filament materials, and (iii) the need for a specific structure to support the hot cathode and anode, especially in view of the severe shock and vibration conditions encountered during logging operations.

Moreover, according to applicant's knowledge, the known hot cathode ion sources were implemented in laboratories and designed mainly for experimental purpose, which applications are not subjected to the severe environmental constraints typical of the logging techniques. In other words, performances of these known hot cathode ion source could be considered sufficient for laboratory measurements but would not be acceptable for logging applications, even assuming they could be directly implemented in a logging tool. Among others, one could mention, as constraints specific to logging applications: weight and dimensions, safety, neutron pulse shape, neutron output, power requirements, and operating lifetime.

Accordingly, although the neutron generators used so far in the logging techniques have been working relatively satisfactory, there still is a need for an improvement to the neutron output and especially to the neutron pulse shape.

SUMMARY OF THE INVENTION

It is a general object of the present invention to provide an improved neutron generator, especially suitable for logging techniques.

It is a first particular object of the invention to propose a neutron generator providing neutron pulses having a substantially square shape, to wit: (i) a sharp rise; (ii) a substantially "flat" plateau; and (iii) a sharp cut-off (very abrupt termination of the neutron burst).

A second specific object of the invention is to propose a neutron generator of reduced weight and dimensions.

It is a third particular object of the invention to provide a neutron generator with relatively low ion energies at the low source aperture, thus reducing metal erosion of the electrodes and improving the voltage stability.

It is a fourth specific object of the invention to propose a neutron generator wherein the rise edge (or leading edge) of the neutron flux appears with a reduced delay after the voltage pulse is applied to the anode, thus simplifying the timing control process of the pulses.

It is a fifth specific object of the invention to provide a neutron generator with a hot cathode ion source requiring minimum power to operate.

It is a sixth object of the invention to provide a neutron generator requiring pulses of relatively low voltages to produce the ion beam, making it possible to eliminate the need for an ion source transformer. (by using, e.g. solid state switches).

It is a seventh object of the invention to provide a neutron generator wherein pulses of very different duration can be applied to the ion source, allowing for complex series of pulse lengths during a well logging measurement without requiring a reconfiguration of the ion source pulsing circuit.

It is an eighth specific object of the invention to provide a neutron generator showing a high mechanical or electrical ruggedness, especially for use in a logging tool.

These objects and other are attained, according to the invention, with a logging tool for investigating earth formations surrounding a borehole, comprising:

1) a sonde incorporating at least one radiation detector; and
2) a neutron generator comprising:
   (i) an ion source comprising an anode and a thermionic cathode disposed in an ionizable gas environment;
   (ii) means for heating the cathode so that the latter emits electrons which, when colliding with the gas atoms, generate ions;
   (iii) a target;
   (iv) an electrical gap to accelerate ions from the ion source towards the target upon impingement of the ions; and
   (v) control means for applying voltages to the anode, cathode and electrical gap.

The cathode is preferably of the dispenser or volume type. The terms "thermionic", "dispenser" and "volume" will be hereafter explained.

In a preferred embodiment, the gas comprises at least one hydrogen isotope and the gas environment constitutes a sealed chamber.

The cathode advantageously includes a substratum made of porous tungsten and an emitter material including barium oxide and/or strontium oxide.

The voltage supply means for the cathode are distinct from the cathode heating means.

The neutron generator may further comprise means for preventing slow ions still present in the ion source at the end of the voltage pulse, from leaving the ion source. The preventing means comprises a cut-off electrode disposed at the end of the ion source and which is submitted to voltage pulses synchronized with and complementary to pulses applied to the anode, and to a positive voltage between the pulses. The cut-off electrode includes a convex mesh screen.

The invention also relates to a neutron generator comprising:
- an ion source comprising an anode and a dispenser or volume type cathode disposed in an ionizable gas environment including at least one hydrogen isotope;
- means for heating the cathode so that the latter emits electrons which, when colliding with the gas atoms, generate ions;
- a target;
- an electrical gap to accelerate ions from the ion source towards the target upon impingement of the ions; and
- control means for applying voltages to the anode, cathode and electrical gap.

The characteristics and advantages of the invention will appear better from the description to follow, given by way of a non limiting example, with reference to the appended drawing in which:

DESCRIPTION OF THE PREFERRED EMBODIMENT

Figure 1:
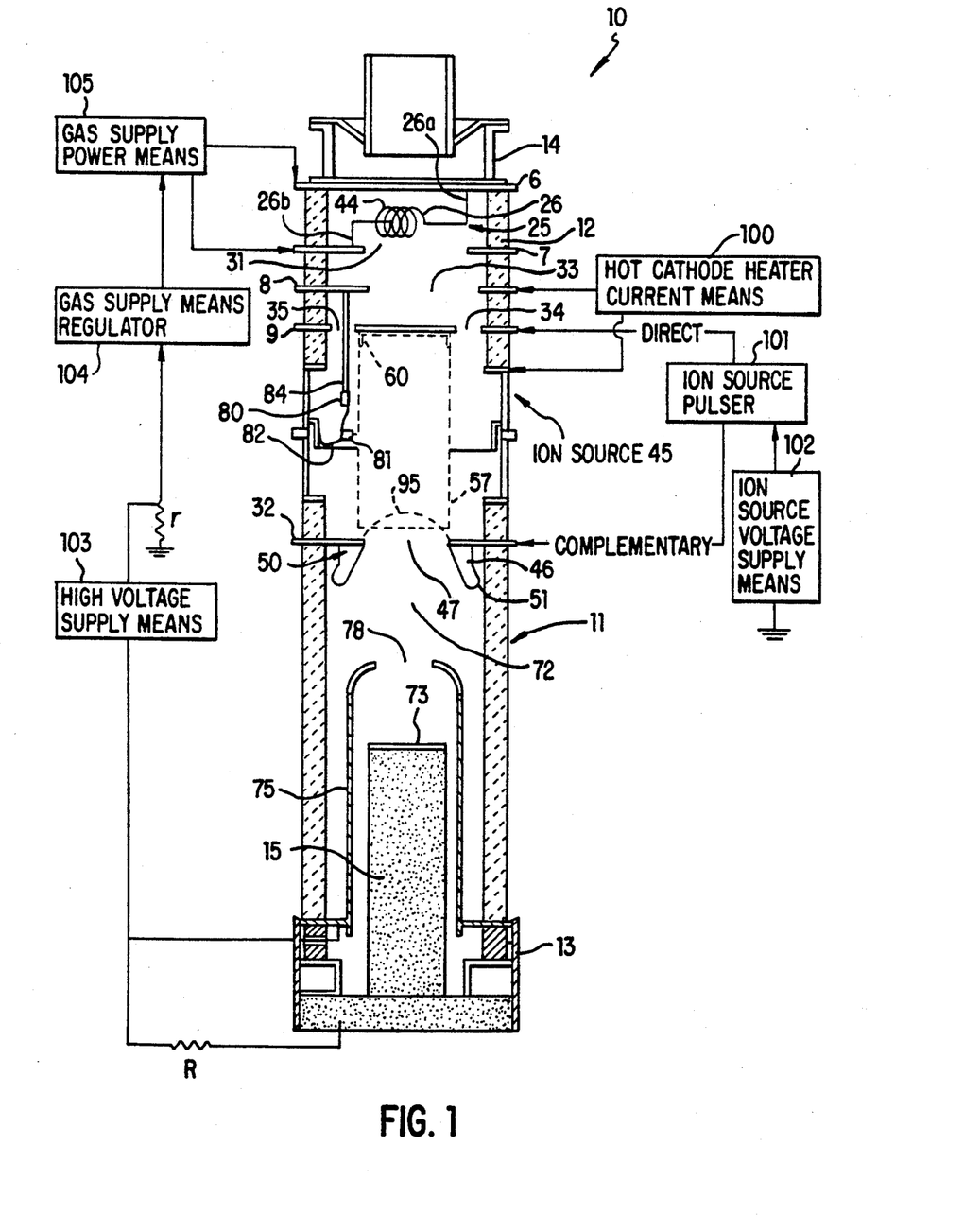
FIG. 1 is a cross section view of a neutron generator according to the invention.

FIG. 1 shows a neutron generator 10 which may be used in a logging tool such as described e.g. in U.S. Pat. Nos. 4,794,792, 4,721,853 or 4,600,838, which are herein incorporated by reference. The major components of the neutron generator 10 are a hollow cylindrical tube 11 made of an insulating material such as alumina ceramic and having its respective longitudinal extremities fixed to a ceramic ring 12 and a conductive ring 13, an ion source 45, a gas supply means 25, an extracting electrode 50, and a massive copper target electrode 15. A transverse header 14 and the target electrode 15 close the rings 12 and 13, respectively, to provide a gas-tight cylindrical envelope. Ring 12 comprises parallel transversely disposed flanges 6, 7, 8, and 9, providing electrically conductive paths and sturdy support for the generator components as described subsequently in more complete detail. Flanges 6–9 are substantially equally spaced along ring 12, between header 14 and the corresponding extremity of tube 11. The gas supply means 25 is disposed transversely to the longitudinal axis I—I of the generator 10, between first flange 6 and second flange 7, closest to header 14. The gas supply means 25 comprises a helically wound filament 26 of tungsten, which may be heated to a predetermined temperature by an electric current from a gas supply power means 105 to which both ends 26a and 26b of filament 26 are connected.

A film 44 of zirconium or the like, for absorbing and emitting deuterium and tritium, is coated on the intermediate turns of the filament 26 in order to provide a supply of these gases and to control gas pressure during generator operation. Due to physical isolation, a substantially uniform temperature can be maintained along the coated intermediate turns of the filament helix 26.

As the gases released from the film 44 are withdrawn from the atmosphere within the envelope for ion generation, more gases are emitted to restore the envelope gas pressure to a level commensurate with the temperature of the intermediate portion of the filament helix 26. The gases emitted by the film 44 diffuse through holes provided in flanges 7–9, i.e. a hole 31 in second flange 7, a hole 33 in third flange 8 and holes 34, 35 in fourth flange 9. The gases emitted finally enter an ion source 45 interposed between the gas supply means 25 and the extremity of tube 11 facing ring 12. An annular shaped electrical insulator 90 is interposed between tube 11 and ring 12. More details on the structure of the neutron generator can be found e.g. in U.S. Pat. Nos. 3,756,682; or 3,775,216; or 3,546,512, which are herein incorporated by reference.

The ion source 45 comprises a cylindrical hollow anode 57 aligned with the longitudinal axis I—I of the generator 10 and made out of either a mesh or a coil. Typically, a positive ionizing potential (either direct or pulsed current) comprised in the range of 100–300 volts relative to the cathode, is applied to the anode 57. In one exemplary embodiment of the invention, the anode 57 is about 0.75 inch (1.9 cm) long and has a diameter of approximately 0.45 inch (1.14 cm). The anode 57 is secured rigidly to flange 9, e.g. by conductive pads 60.

Figure 2A:
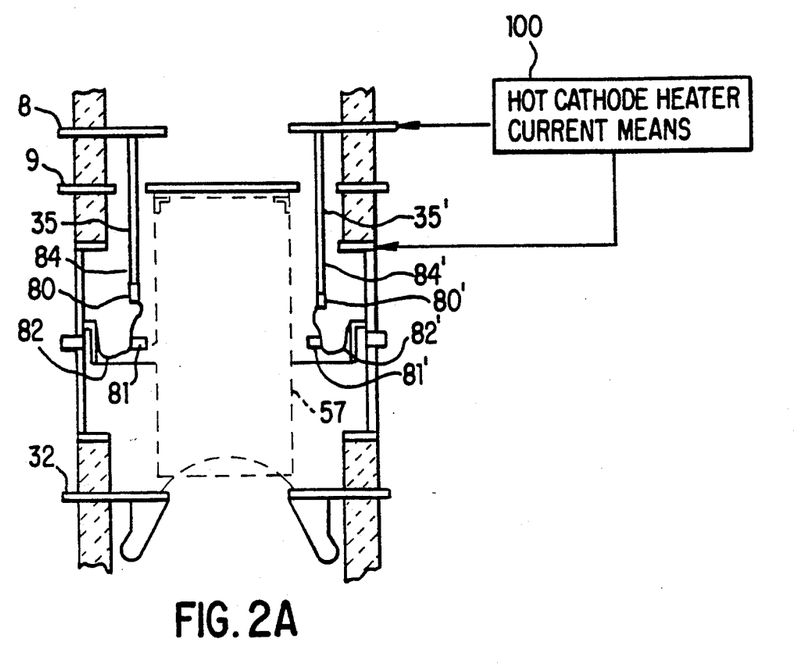
FIGS. 2A and 2B are schematic representations of respective alternate embodiments of the cathode.

The ion source 45 also includes a cathode 80 disposed close to the outside wall of the anode 57, in a substantially median position with respect to the anode. The cathode 80 comprises an electron emitter 81 consisting of a block of material susceptible, when heated, to emit electrons. Emitter 81 is fixed (e.g. by brazing) to the U-shaped end 82 of an arm 84 being itself secured to flange 8. The arm 84 provides also an electrical connection between the emitter 81 and a hot cathode heater current means 100 able to generate e.g. a few watts for heating the emitter. Heater current 100 is known per se (see U.S. Pat. Nos. 3,756,682, 3,775,216 or 3,546,512) and thus does not need to be further described. According to an alternate embodiment shown on FIG. 2A, the cathode 80 could also comprise two arms (similar to arm 84), each provided at one of its ends with a block of dispenser material, both arms being disposed outside the hollow anode 57. This embodiment (cathode disposed outside the anode) prevents the material evaporated from the cathode from coating the surface of suppressor 75 causing enhanced field emission.

Figure 2B:
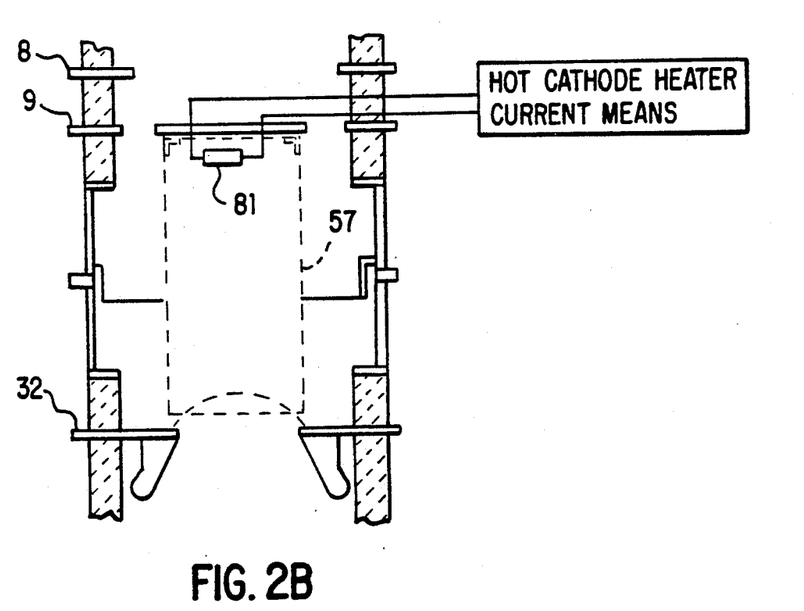

In a further alternate embodiment shown on FIG. 2B, the cathode 80 may also comprise a single arm provided at one end with an emitter, the arm being disposed inside the hollow anode 57, substantially in the center thereof. According to this embodiment, the cathode emitting surfaces are so arranged that electron emission is perpendicular to the axis of the ion source. This embodiment reduces the amount of cathode material being deposited on the suppressor surface.

Now described in more detail is the structure of the cathode 80. The thermionic cathode 80 comprises an emitter block including a material forming a substratum and a material susceptible to emit electrons. Thermionic cathodes here mean heated cathodes, as opposed to cold cathodes which emit electrons when not heated. The thermionic cathodes can be broken down into: (i) those with inherent electron emission capability if they can be heated high enough in temperature without melting (e.g. pure tungsten or tantalum or lanthanum hexa boride), and (ii) those to which use a low work function material is applied, either to the surface of a heated substratum (such as thoria coated tungsten, oxide coated) [called "oxide cathode"], or impregnated in bulk into a porous substrate [called "dispenser" cathode]. General information on thermionic cathodes can be found in the book "Materials and Techniques for Electron Tubes" by W. Kohl, Reinhold Publishing, 1960, pages 519–566, which is herein incorporated by reference. In other words, "oxide" cathode involve what could be called a "surface" reaction, whereas in a "dispenser" cathode there occurs what could be called a "volume" reaction. General information on "dispenser" or "volume" type cathodes can be found e.g. in the article "Surface Studies of Barium and Barium Oxide on Tungsten and its Application to Understanding the Mechanism of Operation of an Impregnated Tungsten Cathode" by R. Forman, in Journal of Applied Physics, vol. 47, No 12, December 1976, pages 5272–5279; or in the article "A Cavity Reservoir Dispenser Cathode for CRT's and Low-cost Traveling-wave Tube Applications" by L. R. Falce, in IEEE transactions on electron devices, vol 36, No 1, January 1989. Cathodes of the "oxide" or "surface" type are described in the article "Compact Pulsed Generator of Fast Neutrons" by P. O. Hawkins and R. W. Sutton, The Review of Scientific Instruments, March 1960, Vol. 31, Number 3, Pages 241–248; in "Focused Beam Source of Hydrogen and Helium Ions" by G. W. Scott, Jr., in Physical Review, May 15, 1939, vol 55, pages 954–959; in U.S. Pat. No. 3,490,944 or U.S. Pat. No. 3,276,974; or in the article "Operation of Coated Tungsten Based Dispenser Cathodes in Nonideal Vacuum" by C. R. K. Marrian and A. Shih, in IEEE Transactions on Electron Devices, vol. 36, No 1, January 1989. All of the above mentioned documents are incorporated herein by reference.

The thermionic cathode 80 of the ion source of the present invention is preferably of the "dispenser" or "volume" type. A dispenser cathode used in a hydrogen environment maximizes electron emissions per heater power unit compared to other thermionic type cathodes (such as $LaB_6$ or W), while operating at a moderate temperature. The emitter block 81 comprises a substrate made of porous tungsten, impregnated with a material susceptible to emit electrons, such as compounds made with combinations of e.g. barium oxide and strontium oxide. Each cathode has different susceptibility to their operating environment (gas pressure and gas species). Dispenser cathodes are known to be the most demanding in terms of the vacuum requirements and care that is needed to avoid contamination. One, among others, of the (novel and non-obvious) features of the invention includes using, in a neutron generator, a dispenser cathode which works as long as several hundred hours in a hydrogen gas environment of pressure on the order of several mTorr, providing an average electron emission current of from 50 to 80 mA yet requiring only a few watts of heater power.

The cathode 80 according to the invention is provided with hot cathode heater current 100 which is distinct from the ion source voltage supply 102. Such implementation permits a better control of both heater current means 100 and voltage supply 102.

The extracting electrode 50 is disposed at the end of the ion source 45 facing target electrode 15, at the level of the junction between tube 11 and ring 12. The extracting electrode 50 is supported in fixed relation to the ring 12 by a fifth flange 32. The extracting electrode 50 comprises a massive annular body 46, e.g. made of nickel or an alloyed metal such as KOVAR (trademark), and which is in alignment with the longitudinal axis I—I of the tube 11. A central aperture 47 in the body 46 diverges outwardly in a direction away from the ion source 45 to produce at the end of body 46 facing target electrode 15 a torus-shaped contour 51. The smooth shape contour 51 reduces a tendency to voltage breakdown that is caused by high electrical field gradients.

Moreover, the extracting electrode 50 provides one of the electrodes for an accelerating gap 72 that impels ionized deuterium and tritium particles from the source 45 toward a deuterium- and tritium-filled target 73. The target 73 comprises a thin film of titanium or scandium deposited on the surface of the transverse side, facing ion source 45, of the target electrode 15.

The potential that accelerates the ions to the target 73 is established, to a large extent, between the extracting electrode 50 and a suppressor electrode 75 hereafter described. The suppressor electrode 75 is a concave member that is oriented toward the target electrode 15 and has a centrally disposed aperture 78 which enables the accelerated ions to from the gap 72 to the target 73. The aperture 78 is disposed between the target 73 and the extracting electrode 50. The suppressor electrode 75 is connected to a high voltage supply means 103 which is also connected, through a resistor "R" to the ground. In order to prevent electrons from being extracted from the target 73 upon ion bombardment (these extracted electrons being called "secondary electrons"), the suppressor electrode 75 is at a negative voltage with respect to the voltage of the target electrode 15.

Figure 3:
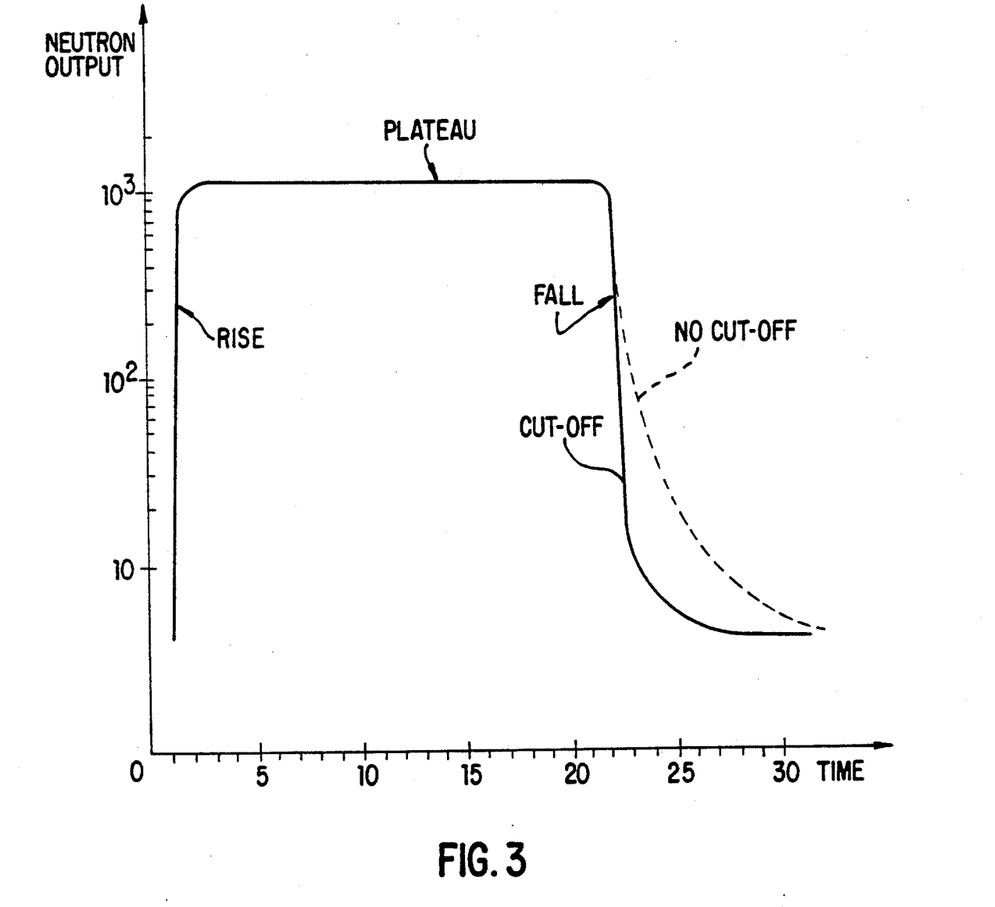
FIG. 3 is an example of plot of neutron output versus time, showing the corresponding neutron pulse.

The velocity of the ions leaving the ion source 45 is, on an average, relatively lower than ion velocity in a known Penning source. Consequently, these slow moving ions tend to generate a tail in the neutron pulse, at the moment the voltage pulse is turned off. The presence of an end tail is detrimental to the pulse shape which, as already stated, is of importance. The present invention remedies this situation by adding to the extractor a cut-off electrode, in the form of a mesh screen 95, which is fixed, e.g. by welding, to the aperture 47 of the extracting electrode 50, facing the ion source 45. The mesh screen 95 (cut-off electrode) is e.g. made of high transparency molybdenum. The cut-off electrode 95 is submitted to voltage pulses synchronized with and complementary to the voltage pulses applied to the anode 57. The pulses applied to cut-off electrode 95 are positive and e.g. of 100 to 300 volts. In an alternate embodiment, the cut-off electrode 95, instead of being submitted to voltage pulses, is maintained at a positive voltage, of e.g. a few volts. This low positive voltage prevents the slow ions produced at the end of the pulse in the ion beam from leaving the ion source, and thus allows one to truncate the terminal part of the ion beam, which in turn provides a sharp cut-off at the end of the neutron pulse (i.e. a short fall time). The cut-off electrode 95 is preferably made of a metallic grid in the form of a truncated sphere, and its concavity turned towards the target 73. Part of the mesh screen 95 might protrude inside cylindrical hollow cathode 57. FIG. 3 shows two examples of neutron pulses obtained respectively with cut-off electrode (solid line) and without cut-off voltage (dotted line), everything else being equal. The benefit to the neutron pulse shape (especially the fall time) derived from the cut-off electrode is easily appreciated from FIG. 3.

In an alternate embodiment, (wherein the extractor 50 is not provided with the cut-off screen 95), the end tail of the ion beam is truncated by applying a positive voltage pulse to the extracting electrode 50.

In order to generate a controlled output of neutrons, continuously or in recurrent bursts, an ion source voltage supply means 102 provides power for the bombarding ion beam. For pulse operation, an ion source pulser 101 is provided at the output of ion source voltage supply 102 to regulate the operation of voltage supply to the ion source. The ion source pulser 101 has a direct output connected to the anode 57 (via flange 9) and a complementary output connected to extracting electrode 50. The high voltage supply 103, the ion source voltage supply 102, and the ion source pulser 101 may be of any suitable type such as e.g. described in U.S. Pat. Nos. 3,756,682 or 3,546,512, already referred to. A gas supply means regulator 104 (connected to the high voltage supply means 103) regulates, through a gas supply power means 105, the intensity of the ion beam by controlling the gas pressure in the envelope. The current flowing through resistor r provides a measure of ion beam current which enables the gas supply regulator 104 to adjust the generator gas pressure accordingly. The voltage developed by the high voltage supply 103, moreover, is applied directly to the suppressor electrode 75 and through a resistor R to the target electrode 15. The voltages thus developed provide the accelerating and suppressor voltages, respectively. During operation, current is passed through the filament 26 of the gas supply 25 in an amount regulated by the gas supply regulator means 104 to achieve a deuterium-tritium pressure within the generator envelope that is adequate to obtain a desired ion beam current and ad hoc conditions for the generator to operate.

The high voltage established between the extracting electrode 50 and the suppressor electrode 75 produces a steep voltage gradient that accelerates deuterium and tritium ions from the electrode aperture 47 in extracting electrode 50 toward the target 73. The energy imparted to the ions is sufficient to initiate neutron generating reactions between the bombarding ions and the target nuclei and to replenish the target 73 with fresh target material. Initial bombardment of a fresh target 73 by, for example, a half-and-half mixture of deuterium and tritium ions, produces relatively few neutrons. As increasing quantities of impinging ions penetrate and are held in the lattice of the target, however, the probability for nuclear reactions increases. Thus, after a short period of ion bombardment, a continuous or pulsed output ranging from $10^7$ to $10^9$ neutrons per second is reached.

As previously described, the regulator 104 regulates the power supplied to the filament 26 and thereby manipulates the tube gas pressure and the ion beam intensity to produce the desired neutron output. If the neutron output should increase as a result of an increase in the current, a corresponding increase in current through the resistor causes the regulator 104 to decrease the filament power supply and thereby reduce the gas pressure within the generator. The lower gas pressure in effect decreases the number of ions available for acceleration, and thus restores the neutron output to a stable, predetermined value. Similarly, a decrease in the current through the resistance causes the regulator 104 to increase the generator gas pressure.

If desired, the neutron output can be monitored directly, and either the ion source voltage supply or the high voltage power supply can be controlled automatically or manually to achieve stable generator operation. In the event the generator is supplied only with deuterium gas, neutrons are produced as a result of deuterium-deuterium interactions, rather than the deuterium-tritium reactions considered in the foregoing illustrative description.

The present invention provides the following advantages, as compared to the prior art neutron generators.

Since no magnet is necessary, the neutron generator is lighter and of smaller dimensions than the prior art generators. This is a substantial improvement for logging applications due to the limited space available in the logging tools.

The use of a dispenser cathode virtually cancels, or at least substantially reduces, the delay between the time the generator is turned on and the production of neutrons, and thus provides a sharp rise of neutron burst. This also results in an improved burst timing control.

Also, the thermionic cathode operates without troublesome plasma mode transitions responsible for disturbing jumps in the neutron output, and for difficulties in using the beam control feedback loop with the reservoir heater.

The erosion of the extractor and consequent coating of insulator surfaces, by sputtered metal due to ion bombardment, is substantially reduced because of the relatively low anode voltage. The reduced anode voltage allows one to use simplified pulsing circuitry.

The voltage applied to the cut-off screen-electrode 95 allows the tail of the ion beam to be cut-off, made mainly of slow ions, and thus allows the generation of a neutron pulse showing a sharp end edge.

Finally, the lifetime of the cathode is in the range of several hundred hours in a hydrogen gas environment of pressure on the order of several mTorr providing an average electron emission current of from 50 to 80 mA, yet requiring only a few watts of heater power.

Above all, the invention is beneficial in term of pulse shape. In particular, the neutron pulse shows the following characteristics, as can be seen from FIG. 3:

the time required for the instantaneous neutron output to reach its maximum, called plateau, measured from the instant when the voltage is applied to said cathode, is less than 1.5 microsecond;

the fall time, i.e. the period of time between the instant when the voltage applied to said cathode is turned off and the instant when the instantaneous neutron output falls to 10% of the plateau, is less than 0.5 microsecond;

the neutron output reaches a plateau which remains constant within a 10% range thereof, over a pulse time width comprised between 5 and 500 microseconds;

the time lag between the instant when the voltage is applied to said cathode and the instant when the instantaneous neutron output reaches 10% of the plateau, is less than 0.5 microsecond; another benefit is that the time lag is independent of operational parameters of the ion source, such as gas pressure; and the rise time for the neutron output to reach 90% of the plateau, measured from the time when the neutron output is 10% of said plateau, is less than 1 microsecond.

What is claimed is:

1. A neutron generator comprising:
   (i) an ion source comprising an anode and a dispenser cathode disposed in an ionizable gas environment;
   (ii) means for heating said cathode so that the latter emits electrons which, when colliding with said gas atoms, generate ions;
   (iii) a target;
   (iv) an electrical gap to accelerate ions from said ion source towards said target upon impingement of said ions; and
   (v) control means for applying voltages to said anode, cathode and electrical gap, wherein a voltage applied to said anode by said control means is between 100 and 300 Volts to substantially reduce metal sputtering within the neutron generator.

2. The neutron generator according to claim 1, wherein said gas comprises at least one hydrogen isotope.

3. The neutron generator according to claim 2, wherein said gas environment constitutes a sealed chamber.

4. The neutron generator according to claim 1, wherein said cathode comprises at least one block of material comprised of a substrate impregnated with an electron emitting material.

5. The neutron generator according to claim 4 wherein said substrate is tungsten and said emitter material includes barium oxide.

6. The neutron generator according to claim 1, wherein said voltages are in the form of square voltage pulses.

7. The neutron generator according to claim 1 wherein said voltage applying means for said cathode is distinct from said cathode heating means.

8. The neutron generator according to claim 1, wherein said anode is made of a hollow elongated body permeable to electrons.

9. The neutron generator according to claim 8, wherein said anode is made of a cylindrical metallic coil.

10. The neutron generator according to claim 8, wherein said anode is made of a cylinder-shaped mesh.

11. The neutron generator according to claim 4, wherein said block is disposed at one end of an arm connected to said heating means and to said control means.

12. The neutron generator according to claim 8, wherein said cathode is disposed inside said anode.

13. The neutron generator according to claim 8, wherein said cathode is disposed outside said anode.

14. The neutron generator according to claim 11 wherein said cathode comprises two arms disposed diametrically on the outside of said anode.

15. The neutron generator according to claim 1, further comprising an extracting electrode disposed at the end of said ion source facing said target and submitted to a voltage complementary to the anode voltage.

16. The neutron generator according to claim 15, wherein the end of said extracting electrode facing said target is torus shaped.

17. The neutron generator according to claim 6, further comprising means for preventing slows ions, still present in said ion source at the end of said voltage pulse, from leaving said ion source.

18. The neutron generator according to claim 17 wherein said preventing means comprises a cut-off electrode disposed at the end of the ion source and which is submitted to voltage pulses synchronized with and complementary to pulses applied to said anode, and to a positive voltage between said pulses.

19. The neutron generator according to claim 18 wherein said cut-off electrode includes a mesh screen.

20. The neutron generator according to claim 19 wherein said mesh screen is in the form of a truncated sphere having its concavity facing said target.

21. The neutron generator according to claim 17 wherein said preventing means comprises means for applying to said extracting electrode negative voltage pulses synchronized with pulses applied to said anode, and a positive voltage between said pulses.

22. The neutron generator according to claim 3 comprising a cylindrical insulator disposed between said ion source and said target.

23. The neutron generator according to claim 22 wherein said insulator is made of ceramic.

24. The neutron generator according to claim 1 wherein said gas environment comprises a gas supply means incorporating a helical filament coated with material able, when heated, to emit atoms of at least one hydrogen isotope and disposed transversely to the longitudinal axis of the accelerating gap.

25. The neutron generator according to claim 23 wherein the gas pressure in said gas environment is comprised between 0.5 milliTorr and 20 milliTorr.

26. A neutron generator comprising:
   an ion source comprising an anode and a dispenser or volume type cathode disposed in an ionizable gas environment including at least one hydrogen isotope;

means for heating said cathode so that the latter emits electrons which, when colliding with said gas atoms, generate ions;

a target;

an electrical gap to accelerate ions from said ion source towards said target upon impingement of said ions; and control means for applying voltages to said anode, cathode and electrical gap, wherein a voltage applied to said anode by said control means is between 100 and 300 Volts to substantially reduce metal sputtering within the neutron generator.

27. A logging tool for investigating earth formations surrounding a borehole, comprising a sonde incorporating at least one radiation detector and a neutron generator, said neutron generator comprising:

(i) an ion source comprising an anode and a dispenser cathode disposed in an ionizable gas environment;

(ii) means for heating said cathode so that the latter emits electrons which, when colliding with said gas atoms, generate ions;

(iii) a target;

(iv) an electrical gap to accelerate ions from said ion source towards said target upon impingement of said ions; and (v) control means for applying voltages to said anode, cathode and electrical gap, wherein a voltage applied to said anode by said control means is between 100 and 300 Volts to substantially reduce metal sputtering within the neutron generator.

28. A neutron generator for logging applications, comprising:

a source of ionizable gas;

an ion source for ionizing said gas and including an anode and a dispenser type cathode designed to emit electrons able to impinge on gas atoms so as to generate ions;

a target spaced apart from said ion source by an accelerating gap, and being able to emit neutrons upon impingement of ions issued from said ion source;

control means for applying voltages to said anode, cathode and electrical gap; and means for operating said control means such that the rise time for the neutron output to reach 90% of the maximum output plateau), measured from the time when the neutron output is 10% of said plateau, is less than 1 microsecond.

29. A neutron generator for logging applications, comprising:

a source of ionizable gas;

an ion source for ionizing said gas and including an anode and a dispenser type cathode designed to emit electrons able to impinge on gas atoms so as to generate ions;

a target spaced apart from said ion source by an accelerating gap, and being able to emit neutrons upon impingement of ions issued from said ion source;

control means for applying voltages to said anode, cathode and electrical gap; and means for operating said control means such that the time lag between the instant when the voltage is applied to said cathode and the instant time when the instantaneous neutron output reaches 10% of the maximum output (plateau), is less than 0.5 microsecond.

30. A neutron generator for spectral logging applications, comprising:

a source of ionizable gas;

an ion source for ionizing said gas and including an anode and a dispenser type cathode designed to emit electrons able to impinge on gas atoms so as to generate ions;

a target spaced apart from said ion source by an accelerating gap, and being able to emit neutrons upon impingement of ions issued from said ion source;

control means for applying pulsing voltages to said anode, cathode and electrical gap; and means for operating said control means such that the neutron output reaches a maximum value (or plateau) which remains constant within a 10% range thereof, over a pulse time width comprised between 18 and 25 microsecond.

31. A neutron generator for logging applications, comprising:

a source of ionizable gas;

an ion source for ionizing said gas and including an anode and a dispenser type cathode designed to emit electrons able to impinge on gas atoms so as to generate ions;

a target spaced apart from said ion source by an accelerating gap, and being able to emit neutrons upon impingement of ions issued from said ion source;

control means for applying voltages to said anode, cathode and electrical gap; and means for operating said control means such that the fall time between the instant when the voltage applied to said cathode is turned off and the instant time when the instantaneous neutron output falls to 10% of the maximum output (plateau), is less than 0.5 microsecond.

32. A neutron generator for spectral logging applications, comprising:

a source of ionizable gas;

an ion source for ionizing said gas and including an anode and a dispenser type cathode designed to emit electrons able to impinge on gas atoms so as to generate ions;

a target spaced apart from said ion source by an accelerating gap, and being able to emit neutrons upon impingement of ions issued from said ion source;

control means for applying voltages to said anode, cathode and electrical gap; and means for operating said control means such that the time required for the instantaneous neutron output to reach its maximum (plateau) value, measured from the instant time when the voltage is applied to said cathode, is less than 1.5 microsecond.

33. A method for investigating earth formation surrounding a borehole, comprising the steps of:

irradiating, at a first given location in the borehole, the borehole materials and the earth formation with bursts of neutrons from a neutron generator including an ion source comprising an anode and a dispenser cathode disposed in an ionizable gas environment, by applying voltage pulses to the cathode and heating the dispenser cathode;

detecting, at a second given location in the borehole, radiation resulting from interaction of the neutrons with the formation;

generating signals representative of the radiation;

controlling the neutron output during the start of the neutron burst such that the rise time for the neutron output to reach 90% of its plateau, measured from the time when the neutron output is 10% of the plateau, is less than 1 microsecond; and determining from the signals a characteristic of the earth formation surrounding the borehole.

34. A method for investigating earth formation surrounding a borehole, comprising the steps of:
generating bursts of neutrons from a neutron generator including an ion source comprising an anode and a dispenser cathode disposed in an ionizable gas environment, by applying voltage pulses to the cathode and heating the cathode;
irradiating, at a first given location in the borehole, the borehole materials and the earth formation with bursts of neutrons;
detecting, at a second given location in the borehole, radiation resulting from interaction of the neutrons with the formation;
generating signals representative of the radiation;
controlling the neutron burst during the start of the neutron burst such that the time lag between the instant when the voltage is applied to the cathode and the instant time when the instantaneous neutron output reaches 10% of its plateau, is less than 0.5 microsecond; and
determining from the signals a characteristic of the earth formation surrounding the borehole.

35. A method for investigating earth formation surrounding a borehole, comprising the steps of:
irradiating, at a first given location in the borehole, the borehole materials and the earth formation with bursts of neutrons from a neutron generator including an ion source comprising an anode and a dispenser cathode disposed in an ionizable gas environment, by applying voltage pulses to the cathode and heating the dispenser cathode;
detecting, at a second given location in the borehole, radiation resulting from interaction of the neutrons with the formation;
generating signals representative of the radiation;
controlling the neutron output such that the neutron output reaches a plateau which remains constant within a 10% range thereof, over a burst time width comprised between 18 and 25 microsecond; and
determining from the signals a characteristic of the earth formation surrounding the borehole.

36. A method for investigating earth formation surrounding a borehole, comprising the steps of:
generating bursts of neutrons from a neutron generator including an ion source comprising an anode and a dispenser cathode disposed in an ionizable gas environment, by applying voltage pulses to the cathode and heating the cathode;
irradiating, at a first given location in the borehole, the borehole materials and the earth formation with bursts of neutrons;
detecting, at a second given location in the borehole, radiation resulting from interaction of the neutrons with the formation;
generating signals representative of the radiation;
controlling the neutron output such that the fall time between the instant when the voltage applied to the cathode is turned off and the instant time when the instantaneous neutron output falls to 10% of its plateau, is less than 0.5 microsecond; and
determining from the signals a characteristic of the earth formation surrounding the borehole.

37. A method for investigating earth formation surrounding a borehole, comprising the steps of:
generating bursts of neutrons from a neutron generator including an ion source comprising an anode and a dispenser cathode disposed in an ionizable gas environment, by applying voltage pulses to the cathode and heating cathode;
irradiating, at a first given location in the borehole, the borehole materials and the earth formation with bursts of neutrons;
detecting, at a second given location in the borehole, radiation resulting from interaction of the neutrons with the formation;
generating signals representative of the radiation;
controlling the neutron output during the neutron burst such that the time required for the instantaneous neutron output to reach a plateau, measured from the instant time when the voltage is applied to the cathode, is less than 1.5 microsecond; and
determining from the signals a characteristic of the earth formation surrounding the borehole.

38. A method for investigating earth formation surrounding a borehole, comprising the steps of:
generating bursts of neutrons from a neutron generator including an ion source comprising an anode and a dispenser cathode disposed in an ionizable gas environment, by applying voltage pulses to the cathode and heating the cathode;
irradiating, at a first given location in the borehole, the borehole materials and the earth formation with bursts of neutrons;
detecting, at a second given location in the borehole, radiation resulting from interaction of the neutrons with the formation;
generating signals representative of the radiation;
controlling the neutron output such that: (i) the rise time for the neutron output to reach 90% of its plateau, measured from the time when the neutron output is 10% of the plateau, is less than 1 microsecond; (ii) the fall time between the instant when the voltage applied to the cathode is turned off and the instant time when the instantaneous neutron output falls to 10% of the plateau, is less than 0.5 microsecond; and
determining from the signals a characteristic of the earth formation surrounding the borehole.

39. A method for investigating earth formation surrounding a borehole, comprising the steps of:
generating bursts of neutrons from a neutron generator including an ion source comprising an anode and a dispenser cathode disposed in an ionizable gas environment, by applying voltage pulses to the cathode and heating the cathode;
irradiating, at a first given location in the borehole, the borehole materials and the earth formation with bursts of neutrons;
detecting, at a second given location in the borehole, radiation resulting from interaction of the neutrons with the formation;
generating signals representative of the radiation;
controlling the neutron output such that: (i) the rise time for the neutron output to reach 90% of its plateau, measured from the time when the neutron output is 10% of the plateau, is less than 1 microsecond; (ii) the fall time between the instant when the voltage applied to the cathode is turned off and the instant time when the instantaneous neutron output falls to 10% of its plateau, is less than 0.5 microsecond; and (iii) the neutron output reaches a plateau which remains constant within a 10% range thereof, over a pulse time width comprised between 18 and 25 microsecond; and
determining from the signals a characteristic of the earth formation surrounding the borehole.

* * * * *